Aug. 22, 1939. J. P. WATSON 2,170,623
MEANS FOR CONTROLLING THE OUTPUT POWER OF ELECTRIC MOTORS
Filed Aug. 22, 1938
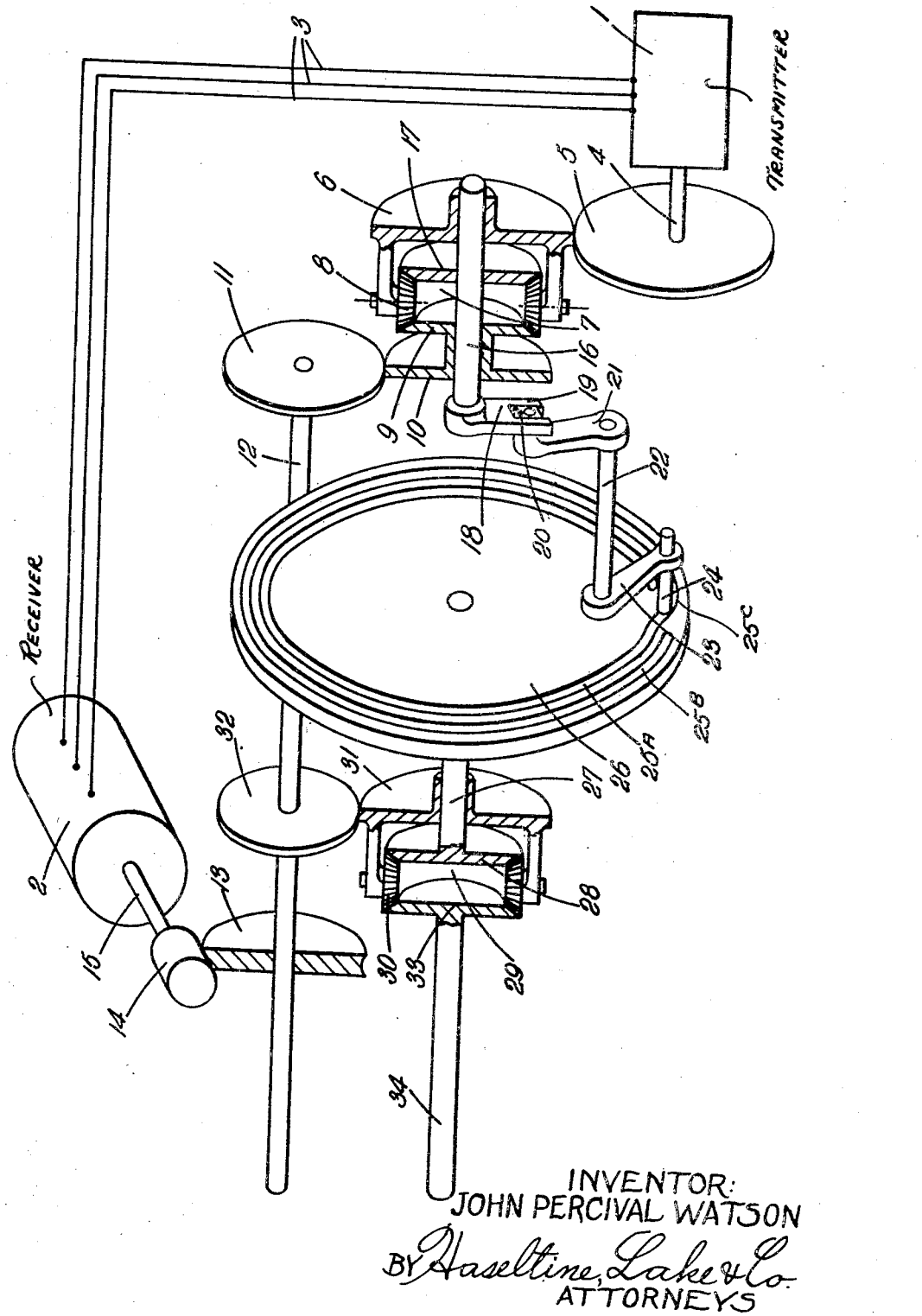
INVENTOR:
JOHN PERCIVAL WATSON
BY Haseltine, Lake & Co.
ATTORNEYS Patented Aug. 22, 1939

2,170,623

UNITED STATES PATENT OFFICE 2,170,623

MEANS FOR CONTROLLING THE OUTPUT POWER OF ELECTRIC MOTORS

John Percival Watson, Sidcup, England, assignor to Vickers-Armstrongs Limited, London, England, a British company Application August 22, 1938, Serial No. 226,154
In Great Britain August 20, 1937

4 Claims. (Cl. 172—239)

This invention relates to electrical hunter power follow-up apparatus.

Electrical hunter follow-up apparatus as hitherto known and employed essentially consists of a sensitive control element arranged in relation to the transmitter and receiver in such manner that the sensitive control element may be off-set from zero position to cause actuation of the transmitter, said element being returned to the zero position by the movement that follows from the receiver due to the so-called "follow-up" action. Since the receiver thus returns the sensitive control element to the zero position and restores the balance of the system, the apparatus is regarded as a "hunter" follow-up; all such systems embodying the hunting principle for resetting the sensitive control elements are subject to the disadvantage that they tend to oscillate about the zero or balance position and power oscillations of the receiver may be produced as a result of mechanical oscillations of the sensitive control element about its zero setting. The tendency for such hunting will be determined by the dimensions of the transmission step as between the transmitter and receiver and the sensitive control element. By the expression "transmission step" there is, of course, meant the displacement which the transmitter must experience in order to produce conditions in the receiver which cause the latter to follow up the movement of the transmitter. If such step is great in comparison with a full cyclic displacement of the transmitter, then the extent to which the receiver may over-run in known hunter systems is correspondingly increased so that, in spite of the characteristic powerful braking feature of step-by-step systems, the apparatus tends to oscillate about its zero setting in an undesired manner.

It has previously been proposed to connect a step-by-step transmitter with a step-by-step receiver both electrically and mechanically, the purely mechanical connection or transmission including a differential gear, the third element of which becomes the sensitive control element of the system. With apparatus disposed in the manner just indicated, upon off-setting the third element of the differential gear, there is produced an unbalance as between the two other elements thereof with the result that if the receiver is stationary the transmitter is mechanically offset. If the transmitter is off-set through an angular distance equivalent to one step of transmission, then the receiver is correspondingly moved and the receiver drives the transmitter through the mechanical transmission until said third element of the differential gear is returned to a zero or equilibrium position, when the electrical and mechanical transmission ceases. In this manner a power follow-up amplification system was obtained. It is the primary object of the invention to employ a power follow-up system of the type just described in obtaining a hunter power follow-up which will work smoothly without the tendency for oscillation about its zero setting.

In accordance with the invention, hunter power follow-up apparatus comprises a power follow-up system of the type described above and means for off-setting the sensitive control element thereof in either direction away from its zero position, said means being operatively connected with the mechanical transmission between the transmitter and receiver so that said means may be returned thereby to a position corresponding to zero setting of the sensitive control element of the power follow-up system. By virtue of the arrangement of the power follow-up system including the said mechanical transmission between the transmitter and receiver, the operative connection to said means actuating the sensitive control element of the power follow-up system may be regarded as directly or indirectly returned to its zero setting by the receiver, depending on where, in the mechanical transmission between the receiver and transmitter, the operative connection to said means is made. However, by varying the effective velocity ratio of such operative connection between the mechanical transmission and the means actuating the sensitive control element, the effect is obtained in relation to the resetting of the said means, of reducing the transmission step which, for reasons indicated above, lessens the tendency for hunting in the system. The means for actuating the sensitive control element of the power follow-up may take any convenient form and is required only to off-set the sensitive control element in the one direction or the other, depending upon which direction said means is itself mechanically moved. Said means may be moved through the intermediary of a differential gear, being connected to one member thereof, the second member of said gear then being connected with the said mechanical transmission, and the free third member then constituting the sensitive control element of the hunter follow-up apparatus, as distinct from the sensitive control element of the follow-up system hitherto referred to.

In order that the said invention may be clearly understood and readily carried into effect the same will now be more fully described with reference to the accompanying drawing, in which there is illustrated diagrammatically an example of an electrical hunter power follow-up apparatus in accordance with the invention.

Referring now to the drawing, 1 represents a step-by-step electric transmitter of well-known kind and 2 a corresponding motor receiver. There are direct electric connections 3 between the receiver and transmitter so that when the control shaft of the transmitter is moved the motor 2 will tend always to follow the movement with a corresponding power amplification depending upon the construction of the motor 2. There is mounted on the shaft 4 a gearwheel 5 (shown diagrammatically without teeth in the drawing) meshing with teeth formed on a differential gear casing 6. The latter is part of a differential gear indicated generally at 7, and it will be seen that the casing 6 operates the centre element 8 of the differential gear. One of the other elements 9 of the differential gear is in driving connection with a wheel 10 meshing with a gearwheel 11 secured upon a shaft 12. The shaft 12 carries a wormwheel 13 engaging a worm 14 secured upon the motor shaft 15. The remaining element 17 of the differential gear 7 connects with a shaft 16, the element 17 being secured thereto or formed integral therewith.

The apparatus so far described constitutes in principle the known electrical follow-up and power amplifier having the electrical connection between the transmitter and receiver and the mechanical transmission formed by the shaft 12 and included differential gear 7. The apparatus is brought into operation by displacement of the shaft 16, which in this case constitutes the sensitive control element of the system. It will be observed that an angular displacement of the shaft 16 will cause the element 17 of the differential gear 7 to be displaced relatively to the element 9 of the differential gear. The latter element 9 will not move on displacement of the shaft 16, since the drive through the worm and wormwheel 14 and 13 will be almost irreversible, and therefore the middle member 8 of the differential gear will adjust itself according to the movement of the shaft 16. If the shaft 16 is turned a distance equivalent to one step of the transmitter, the latter will then transmit electric power along the connections 3 to the motor 2 which will, therefore, be set in operation. As soon as the motor 2 operates, it drives the shaft 12 through the wormwheel and worm 13 and 14, so that the one step difference between transmitter and motor will remain. Such difference can only be eliminated by adjustment of the sensitive control shaft. When the transmitter reaches a limiting position ahead of the receiver motor of approximately two steps, the maximum speed will be reached by the latter.

The invention is applicable to a hunter follow-up arrangement with power amplification. The remaining apparatus illustrated in the drawing and not so far described shows how this invention may be carried into effect with the power follow-up system. The sensitive control shaft 16 is provided with an arm 18 having a yoke end 19. The yoke end 19 receives a slider block 20 secured pivotally to an arm 21, carried fast on a shaft 22. At its opposite end the shaft 22 supports fixedly a further arm 23, having a pin 24 entering a groove formed in the surface of a disc 26. The groove in the disc 26 in this example has two concentric portions 25A and 25B and a relatively canted or inclined connecting portion 25C serving to render the concentric groove parts 25A and 25B continuous. The disc 26 is carried upon a shaft 27 connected to one element 28 of a differential gear 29. The middle member 30 of the differential gear 29 is geared through a casing to a gearwheel 32 secured upon the shaft 12. The remaining element 33 of the differential gear 29 is provided with a shaft 34 which, in this case, constitutes the sensitive control element of the hunter power follow-up apparatus thus formed.

In describing the operation of the complete apparatus, it will first be supposed that the sensitive control element 16 of the power follow-up (shortly called the "follow-up control element") is in a zero setting so that the transmitter 1 and the receiver motor 2 are inoperative. When this is the case, the pin 24 will be located in the centre of the canted or inclined groove portion 25C of the disc 26, as shown in the drawing. If now the sensitive control element 34 of the hunter power follow-up apparatus (shortly called the "hunter control element") is turned, say, in a clockwise direction, then since the shaft 12 will, for the moment, be immovable and, therefore, the casing 31 of the differential gear 29 will be likewise immovable, the shaft 27 will experience a corresponding rotation in an anti-clockwise direction. The pin 24 will then tend to enter the circular portion 25A of the groove in the disc and in so doing the arm 23 will be angularly moved to produce a corresponding angular movement of the follow-up control element 16, which in turn causes movement of the transmitter control shaft 4 through the differential gear 7 in the manner already described, in relation to the follow-up system per se. Assuming that the movement of the hunter control 34 were sufficient to produce an angular movement of the transmitter shaft 4 corresponding to a step thereof, then the receiver will operate and through its output shaft 15 will cause operation of the shaft 12. The gear-wheel 32 of the shaft 12 will now begin to turn the casing 31 in such direction as to return the shaft 27 in a clockwise direction to the position from which it was initially off-set. Such returning movement will continue until the pin 24 again comes into the centre position of the canted groove portion 25C, when the follow-up control element 16 of the power follow-up system will be restored to its zero setting.

In the above, the velocity ratio as between the gearing connecting the shafts 12 and 27 has not been discussed. It will, however, be appreciated that this velocity ratio may be made of any convenient value by the correct choice of gearing. As a guide for such choice, it will be useful to consider the inherent effects of varying such velocity ratio. A quantitative example will be chosen for the purposes of illustration. Let it be supposed that $x°$ of initial angular movement of the shaft 34 produces an angular movement of the shaft 4 of the transmitter 1 corresponding to one step in the transmitter. Now if it is supposed that the gearing as between the shafts 12 and 27 (or 4 and 27) is such that the motor receiver 2 has to make $n$ steps in order to return the shaft 27 through its original $x°$ of displacement to its initial zero setting, then the step value of the transmitter has effectively become $$\frac{x°}{n}$$

when the transmitter is being driven from the motor, as regards the recentreing operation. With the step value reduced to $$\frac{x°}{n}$$

(instead of $x°$ per step), it will be appreciated that the receiver motor 2 may run at a high speed and the stepping action of the receiver motor will be converted into a substantially continuous motion through the relatively small angular value of the step, at the same time retaining the well-known powerful braking feature of the step-by-step type transmission system.

As already indicated, the degree of power amplification will be determined by the transmitter and motor equipment employed.

What I claim and desire to secure by Letters Patent of the United States is—

1. A hunter power follow-up apparatus comprising a step-by-step transmitter and a step-by-step receiver, electrical connections between the transmitter and receiver, a mechanical connection between the mechanical input member of the transmitter and the mechanical output member of the receiver, a differential gear included in said mechanical connection whereby the centre member of such differential gear constitutes the sensitive control element of the power follow-up system thus formed, means for off-setting said sensitive control element in either direction away from its zero position, an operative connection between said mechanical connection and said means to permit the latter to be returned to a position corresponding to zero setting of said sensitive control element.

2. A hunter power follow-up apparatus comprising a step-by-step transmitter and a step-by-step receiver, electrical connections between the transmitter and receiver, a mechanical connection between the mechanical input member of the transmitter and the mechanical output member of the receiver, a first differential gear included in said mechanical connection whereby the centre member of such differential gear constitutes the sensitive control element of the power follow-up system thus formed, means for off-setting the sensitive control element in either direction away from its zero position, a second differential gear having one element connected with said means, and a driving connection from said mechanical connection to a second element of the said second differential gear, the third element of said second differential gear thus constituting the sensitive control element of the hunter power follow-up apparatus.

3. A hunter power follow-up apparatus comprising a step-by-step transmitter and a step-by-step receiver, electrical connections between the transmitter and receiver, a mechanical connection between the mechanical input member of the transmitter and the mechanical output member of the receiver, a first differential gear included in said mechanical connection whereby the centre member of such differential gear constitutes the sensitive control element of the power follow-up system thus formed, a cam device, a follower adapted to co-operate with said cam device so that it may occupy a centralised position with respect thereto, a connection from said follower to said sensitive control element and a resetting gear transmission from said mechanical connection to the cam device.

4. A hunter power follow-up apparatus comprising a step-by-step transmitter and a step-by-step receiver, electrical connections between the transmitter and receiver, a mechanical connection between the mechanical input member of the transmitter and the mechanical output member of the receiver, a first differential gear included in said mechanical connection whereby the centre member of such differential gear constitutes the sensitive control element of the power follow-up system thus formed, a cam device, a follower adapted to co-operate with said cam device so that it may occupy a centralised position with respect thereto, a connection from said follower to said sensitive control element, a second differential gear, a connection from one element of said second differential gear to said cam device, a geared transmission from said mechanical connection to a second element of said second differential gear, the third element of said second differential gear thus constituting the sensitive control element of the hunter power follow-up apparatus.

JOHN PERCIVAL WATSON.